Sept. 29, 1964   H. J. KOZICKI   3,150,737
VEHICLE DRIVELINE CONSTRUCTION
Filed Dec. 7, 1961   3 Sheets-Sheet 1
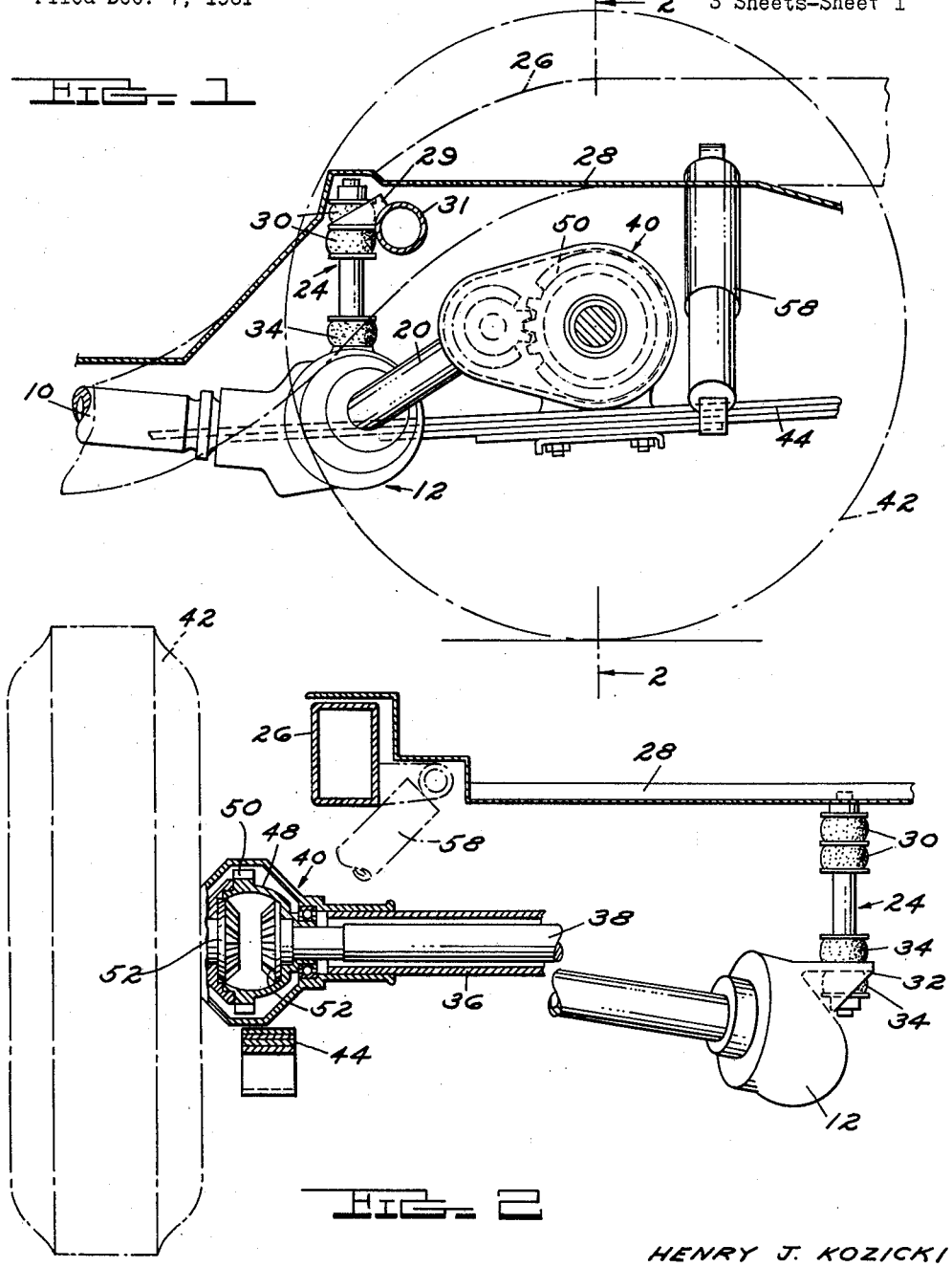
HENRY J. KOZICKI
INVENTOR.
BY John R. Paulkner
Clifford L. Sadler
ATTORNEYS

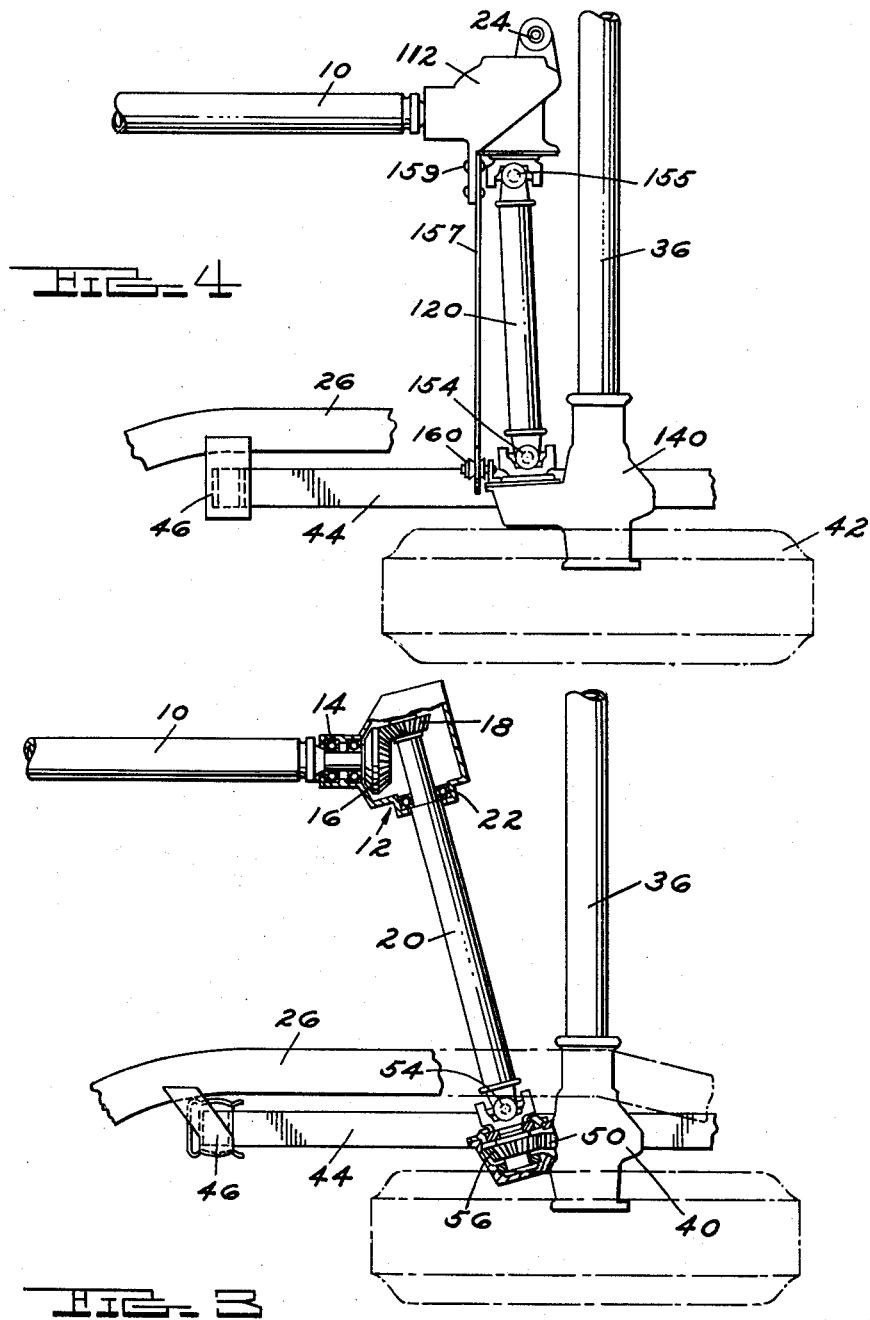

Sept. 29, 1964 H. J. KOZICKI 3,150,737
VEHICLE DRIVELINE CONSTRUCTION
Filed Dec. 7, 1961 3 Sheets-Sheet 3
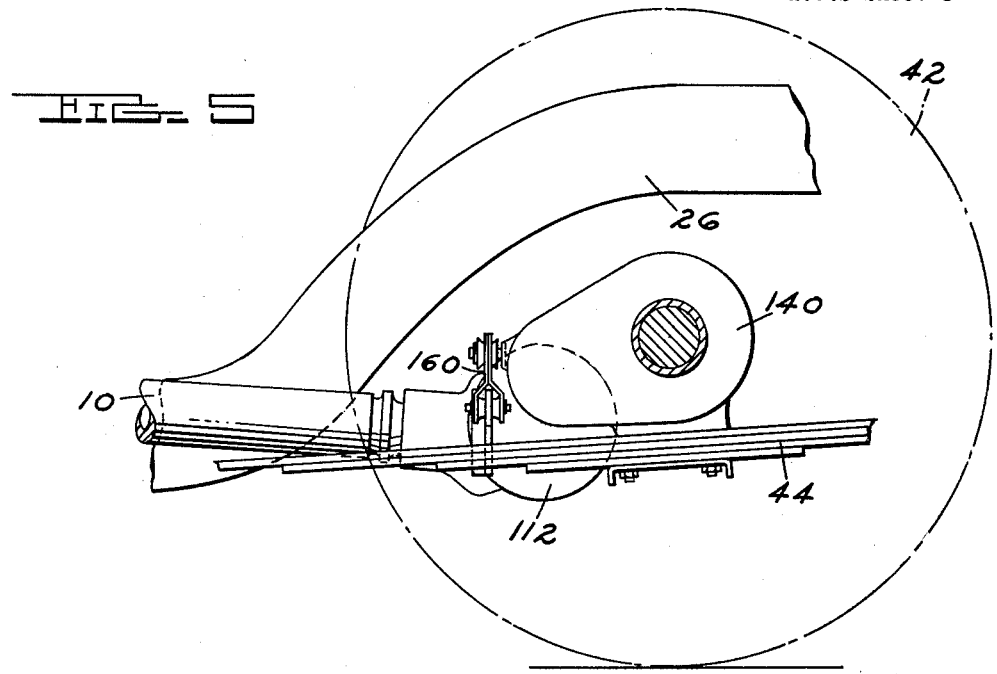
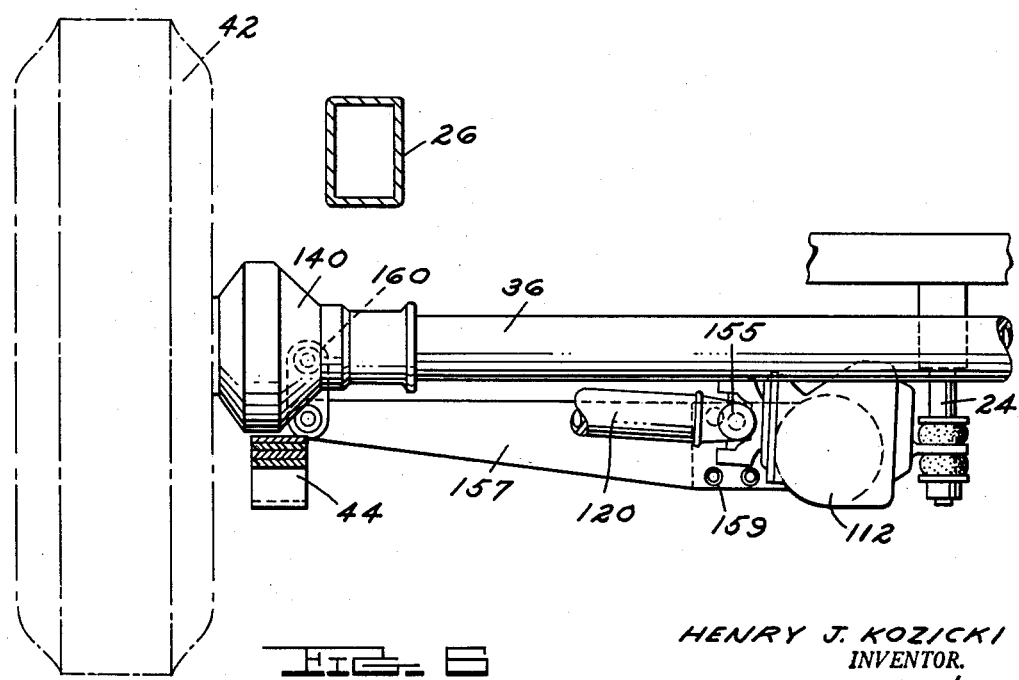
HENRY J. KOZICKI
INVENTOR.
BY John R. Faulkner
Clifford L. Sadler
ATTORNEYS United States Patent Office 3,150,737
Patented Sept. 29, 1964

3,150,737
VEHICLE DRIVELINE CONSTRUCTION
Henry J. Kozicki, Orchard Lake, Mich., assignor to Ford Motor Company, Dearborn, Mich., a corporation of Delaware
Filed Dec. 7, 1961, Ser. No. 157,781
10 Claims. (Cl. 180—70)

The present invention relates to vehicle driveline constructions, and more particularly to a driveline arrangement having a fixed drive shaft.

The conventional vehicle having a solid live rear axle employs a drive shaft that extends rearwardly from a front mounted engine and connects with the axle at a differential gear unit situated at the midpoint of the axle housing. The differential gear unit is of substantial size and because the axle traverses a vertical path in response to jounce and rebound wheel movement, provisions must be made in the floor pan of the vehicle body to avoid interference with the differential movement. This results in a very substantial hump that encroaches upon the passenger compartment. Such encroachment presents considerable restriction to seating arrangement and related passenger comfort.

In view of the present state of the art, it is the principal object of the present invention to provide a driveline arrangement for a motor vehicle in which the conventional differential gear hump in the floor pan may be substantially reduced or eliminated.

It is a more specific object of the present invention to provide an embodiment in which the vehicle drive line construction includes a fixed drive shaft and a rear axle with an asymmetrically situated differential gear unit. The rear end of the drive shaft is fixed in location and is connected to the differential gear unit by a transversely disposed half-shaft.

These and other objects and advantages of the present invention will become amply apparent from the following description taken in conjunction with the accompanying drawings in which:

FIGURE 1 is a side elevational view, partly in section, of a rear axle and drive shaft arrangement incorporating the present invention;

FIGURE 2 is a sectional view taken along section lines 2—2 of FIGURE 1;

FIGURE 3 is a top plan view of the drive shaft and axle arrangement of FIGURES 1 and 2;

FIGURE 4 is a top plan view of an alternate embodiment of the present invention;

FIGURE 5 is a side elevational view of the construction of FIGURE 4; and

FIGURE 6 is a rear elevational view of the construction of FIGURE 5.

Referring now to the drawings wherein like reference numerals identify like parts throughout the various views, FIGURE 1 discloses the rear portion of a motor vehicle in which a drive shaft 10 is connected to a front mounted engine. The drive shaft 10 extends rearwardly from the engine along the longitudinal center line of the vehicle.

The rearmost end of the drive shaft 10 terminates in a bevel gear case 12. The gear case 12 rotatably supports the end of the drive shaft 10 by means of a span of anti-friction bearings 14. Within the case 12, the end of the shaft 10 has a bevel gear 16 that is in mesh with a bevel gear 18 of a transversely extending half-shaft 20. The inner end of the half-shaft 20 is rotatably supported in the case 12 by a roller bearing 22. The gear case 12 is suspended from body structure by means of a shackle device 24 that has flexible rubber connections at both of its ends.

The chassis of the vehicle includes frame side rails 26 upon which a floor pan 28 is secured. The shackle 24 connects to a bracket 29 secured to a cross frame member 31 by means of a conventional construction employing a pair of spaced apart rubber elements 30. The gear case 12 has a protruding bracket 32 to which the shackle is joined by a connection employing rubber elements 34. The construction of the shackle 24 and its connections between the frame member 31 and the gear case 12 permit the gear case to move to a limited extent in a horizontal plane.

The half-shaft 20 extends laterally from the gear case 12 to a connection with the rear axle at a point adjacent to one of the wheels. The rear axle construction comprises an axle housing 36 that contains a right axle shaft 38 which is drivingly connected to a right wheel (not shown). The ends of the shaft 38 are rotatably supported in the housing 36 by anti-friction bearings.

A differential gear case 40 is disposed to one side of the axle housing 36 adjacent to the left wheel 42. A leaf type suspension spring 44 is connected at its forward end 46 to the frame side rail 26. The rear end of the spring 44 is connected to the frame 26 by means of a shackle in a conventional fashion. The differential housing 40 is approximately in line with the leaf spring 44 and is supported thereon.

The differential housing 40 contains a carrier assembly 48 having a ring gear 50 and a pair of side gears 52. The side gears 52 are driven by differential gears (not shown). The gear 52 for the left side is drivingly connected through a stub shaft to the left wheel 42.

The outer end of the half-shaft 20 connects through a universal joint 54 with a spur gear 56 contained within the differential housing 40. The spur gear 56 is in mesh with the ring gear 50.

In addition to the suspension of the rear axle provided by the leaf spring 44 there is a similar spring situated at the right-hand side. A pair of telescopic shock absorbers 58, one of which is shown in phantom, are interposed between the frame side rails and portions of the unsprung mass.

The described construction provides a fixed axle arrangement having many of the advantages of more sophisticated driveline constructions without the complications and expense usually associated with them. In the embodiment of FIGURES 1, 2 and 3, the primary drive shaft 10 is fixed and terminates at its rearward extremity in a hypoid gear box 12 which may provide a gear reduction of 1.5 to 1. The half-shaft 20, to which the ring gear is attached, is routed to one side of the solid axle housing 36 where it is connected to the differential 40 by universal joint 54. The universal joint 54 is attached to the bevel gear 56 whose engagement with the ring gear 50 may provide a 2 to 1 reduction ratio. Because of the reduction ratios of the gear box 12 and the bevel gear 56, the differential 40 may be substantially smaller than conventional size.

The differential and associated gearing is attached to the leaf spring 44 as shown. The housing 40 traverses a vertical path in accordance with wheel motion. Because the gear case 12 is attached to a chassis cross-member by the shackle 24 and the length of the half-shaft 20 is fixed, it is apparent that when the wheel 42 moves in jounce and rebound the half-shaft 20 describes an oscillatory motion about a point approximately at the bottom of the shackle 24. At the same time the gear case 12 moves slightly from side to side during wheel motion. The shackle 24 is used to change slightly the height of the gear case 12 and give an effective length to the half-shaft 20 that is greater than that possible with the usual swing axle construction, such as a de Dion type rear end. The shackle 24 may also be so located as to furnish an anti-torque roll force.

There is also present in this construction an anti-squat force obtainable as follows: The main drive shaft torque attempts to rotate the gear case 12 and the entire half-shaft 20 in a counterclockwise manner as seen in FIGURE 2. The half-shaft 20 bears on the ground at its outer end by virtue of transferring the load resulting from this torque through the gear case of bevel gear 56 to the wheel 42. At its inner end this half-shaft 20 attempts to lift the car via the shackle 24. This latter force is the anti-squat force.

The entire drive shaft 10, gear case 12, half-shaft assembly 20 moves in a fore and aft direction as determined by the leaf spring suspension geometry in the same manner as the axle of a conventional Hotchkiss drive. This movement is taken up by the slip spline situated at the transmission tail shaft. The additional reaction torque that exists in the drive shaft 10 and half-shaft 20 are taken by the shafts themselves.

This construction provides distinct advantages over conventional arrangements having a centrally located drive shaft and differential carrier situated at the midpoint of a live axle. Some of the improvements realized are the possibility of lower vehicle seats, greater cushion thickness, more head room, lower car height, and increased luggage capacity. These advantages result from eliminating the excessive central hump otherwise necessary in the floor pan of the vehicle body.

FIGURES 4, 5 and 6 illustrate an alternate construction. In FIGURE 4, the drive shaft 10 connects to a bevel gear case 112 that is supported by a shackle 24 from the floor pan or a chassis cross-member. The rear wheel 42 and its connection to the differential housing 140 and the axle housing 36 are of similar construction to the species described above and disclosed in FIGURES 1, 2 and 3. The differential housing 140 is supported by the leaf spring 44 that connects to a frame side rail 26 by a resilient bushing 46.

The principal distinction of the embodiment disclosed in FIGURES 4, 5 and 6 is the construction of the connection between the differential housing 140 and the gear case 112. A half-shaft 120 is joined to the spur gear 56 within the housing 140 by means of a universal joint 154. The inner end of the half-shaft 120 connects to the bevel gear case 112 by means of a universal joint 155.

A torque arm 157 formed of flat leaf spring stock is rigidly secured to the bevel gear case 112 by means of rivets 159. Its outer end is secured to the differential housing 140 by a shackle 160 and rubber bushings to permit slight movement therebetween.

This construction eliminates the need for a slip spline at the tail shaft of the transmission and it makes the differential housing 140 more fully independent in movement of the bevel gear case 112. The torque arm 157 is rigid with the gear case 112 but is connected to the housing 140 by a suitable arrangement to permit the mismatch occurring between the arc of the half-shaft 120 and the arc of the torque arm 157. The torque arm 157 is flexible in a fore and aft direction as well as rotationally to accept axle wind-up to some degree. This embodiment also relieves the half-shaft 120 of bending stresses, the torque arm 157 now functioning as the transmitter of the anti-squat torque.

The embodiment disclosed in FIGURES 4, 5 and 6 enjoys the same advantages as described above in connection with the device of FIGURES 1, 2 and 3.

The foregoing description presents the presently preferred embodiment of this invention. Alterations and modifications may occur to those skilled in the art that will come within the scope and spirit of the following claims.

I claim:

1. A motor vehicle having a chassis and a pair of driving wheels, axle means interconnecting said driving wheels, suspension means interconnecting said axle means and said chassis, said suspension means being adapted to support said axle means for jounce and rebound movement relative to said chassis, said axle means having a differential unit disposed adjacent one of said wheels, a drive shaft extending longitudinally and generally centrally of said vehicle and terminating forwardly of said axle means, a gear unit situated at the rear terminus of said drive shaft, a second shaft drivingly interconnecting said gear unit and said differential unit, a flexible torque arm connected to said gear unit and to said differential unit, said gear unit being supported on said chassis by means adapted to permit limited movement in response to jounce and rebound movement of said axle means, said second shaft extending generally transversely of said vehicle chassis, one of said suspension means being connected to said differential unit.

2. A motor vehicle having a chassis and a pair of driving wheels, axle means interconnecting said driving wheels, suspension means interconnecting said axle means and said chassis, said suspension means being adapted to support said axle means for jounce and rebound movement relative to said chassis, said axle means having a differential unit disposed adjacent one of said wheels, a drive shaft extending longitudinally of said vehicle and terminating adjacent said axle means, a gear unit situated at the terminus of said drive shaft, a second shaft interconnecting said gear unit and said differential unit, a torque arm connected to said gear unit and to said differential unit, said gear unit being supported on said chassis by means adapted to permit limited relative movement in response to jounce and rebound movement of said axle means.

3. A motor vehicle having a chassis and a pair of driving wheels, axle means interconnecting said driving wheels, suspension means interconnecting said axle means and said chassis, said suspension means being adapted to support said axle means for jounce and rebound movement relative to said chassis, said axle means having a differential unit disposed adjacent one of said wheels, a drive shaft extending longitudinally of said vehicle and terminating adjacent said axle means, a gear unit situated at the terminus of said drive shaft, a second shaft interconnecting said gear unit and said differential unit, link means suspending said gear unit from said chassis and adapted to permit limited relative movement therebetween.

4. A motor vehicle having a chassis and a pair of driving wheels, axle means interconnecting said driving wheels, said axle means having a differential gear unit disposed adjacent one of said wheels, suspension means adapted to support said axle mean for jounce and rebound movement relative to said chassis and connected to said differential unit, a power delivery unit mounted on said chassis, a nonextensible shaft drivingly connecting said power delivery unit and said differential unit, said power delivery unit being connected to said chassis by means adapted to permit it to move relative to said chassis in response to the jounce and rebound movement of said axle means relative to said chassis, a torque arm connected to each of said units, said shaft being arranged generally transversely of said chassis.

5. A motor vehicle having a chassis and a pair of driving wheels, axle means interconnecting said driving wheels, suspension means interconnecting said axle means and said chassis, said suspension means being adapted to support said axle means for jounce and rebound movement relative to said chassis, said axle means having a differential unit disposed adjacent one of said wheels, a power delivery unit and a nonextensible shaft drivingly connecting said power delivery unit and said differential unit, said power delivery unit being connected to said chassis by means adapted to permit movement relative thereto in response to the jounce and rebound movement of said axle means relative to said chassis, a torque arm connected to each of said units.

6. A motor vehicle having a chassis and a pair of driving wheels, axle means interconnecting said driving wheels, suspension means interconnecting said axle means and said chassis, said suspension means being adapted to support said axle means for jounce and rebound movement relative to said chassis, said axle means having a differential unit disposed adjacent one of said wheels, a drive shaft extending longitudinally and generally centrally of said vehicle and terminating forwardly of said axle means, a gear unit situated at the rear terminus of said drive shaft, a nonextensible second shaft drivingly interconnecting said gear unit and said differential unit, said gear unit being supported on said chassis by means adapted to permit limited movement in response to jounce and rebound movement of said axle means, said second shaft extending generally transversely of said vehicle chassis, one of said suspension means being connected to said differential unit.

7. A motor vehicle having a chassis and a pair of driving wheels, axle means interconnecting said driving wheels, suspension means interconnecting said axle means and said chassis, said suspension means being adapted to support said axle means for jounce and rebound movement relative to said chassis, said axle means having a differential unit disposed adjacent one of said wheels, a drive shaft extending longitudinally and generally centrally of said vehicle and terminating forwardly of said axle means, a gear unit situated at the rear terminus of said drive shaft, a nonextensible second shaft drivingly interconnecting said gear unit and said differential unit, said gear unit being supported on said chassis by means adapted to permit limited movement in response to jounce and rebound movement of said axle means, said second shaft extending generally transversely of said vehicle chassis.

8. A motor vehicle having a chassis and a pair of driving wheels, axle means interconnecting said driving wheels, suspension means interconnecting said axle means and said chassis, said suspension means being adapted to support said axle means for jounce and rebound movement relative to said chassis, said axle means having a differential unit disposed adjacent one of said wheels, a drive shaft extending longitudinally of said vehicle and terminating adjacent said axle means, a gear unit situated at the terminus of said drive shaft, a nonextensible second shaft interconnecting said gear unit and said differential unit, said gear unit being supported on said chassis by means adapted to permit limited relative movement in response to jounce and rebound movement of said axle means.

9. A motor vehicle having a chassis and a pair of driving wheels, axle means interconnecting said driving wheels, said axle means having a differential gear unit disposed adjacent one of said wheels, suspension means adapted to support said axle means for jounce and rebound movement relative to said chassis and connected to said differential unit, a power delivery unit spaced from said differential unit, nonextensible shaft means drivingly connecting said power delivery unit and said differential unit, said shaft means maintaining said units a fixed distance apart, mounting means connecting said power delivery unit to said chassis, said mounting means being adapted to permit movement relative between said differential unit and said chassis in response to the jounce and rebound movement of said axle means relative to said chassis, said shaft being arranged generally transversely of said chassis.

10. A motor vehicle having a chassis and a pair of driving wheels, axle means interconnecting said driving wheels, suspension means interconnecting said axle means and said chassis, said suspension means being adapted to support said axle means for jounce and rebound movement relative to said chassis, said axle means having a differential unit disposed adjacent one of said wheels, a power delivery unit spaced from said differential unit, nonextensible shaft means drivingly connecting said power delivery unit and said differential unit, said shaft means maintaining said units a fixed distance apart, mounting means connecting said power delivery unit to said chassis, said mounting means being adapted to permit movement relative between said power delivery unit and said chassis in response to the jounce and rebound movement of said axle means relative to said chassis.

References Cited in the file of this patent
UNITED STATES PATENTS

| | | |
|---|---|---|
| Re. 16,067 | Feltz | May 12, 1925 |
| Re. 16,579 | Booth | Mar. 29, 1927 |
| Re. 21,138 | Haltenberger | July 4, 1939 |
| 1,900,484 | Church | Mar. 7, 1933 |
| 2,081,237 | Jantsch | May 25, 1937 |
| 2,469,713 | Coleman | May 10, 1949 |
| 2,560,759 | Evernden et al. | July 17, 1951 |
| 3,006,428 | Westmount | Oct. 31, 1961 |
| 3,053,584 | Dunn | Sept. 11, 1962 |